US012612291B2

(12) United States Patent
Yu et al.

(10) Patent No.: US 12,612,291 B2
(45) Date of Patent: Apr. 28, 2026

(54) MAGNETIC-ATTRACTION ROPE-GUIDE PROTECTIVE SHELL, ROPE GUIDE ASSEMBLY, AND VEHICLE

(71) Applicant: T-MAX (HANGZHOU) TECHNOLOGY CO., LTD., Hangzhou (CN)

(72) Inventors: Hangfei Yu, Hangzhou (CN); Taotao Li, Hangzhou (CN)

(73) Assignee: T-MAX (HANGZHOU) TECHNOLOGY, CO., LTD., Zhejiang (CN)

(*) Notice: Subject to any disclaimer, the term of this patent is extended or adjusted under 35 U.S.C. 154(b) by 43 days.

(21) Appl. No.: 18/645,223

(22) Filed: Apr. 24, 2024

(65) Prior Publication Data

US 2024/0351831 A1 Oct. 24, 2024

(30) Foreign Application Priority Data

Apr. 24, 2023 (CN) ......................... 202320960679.3
Jun. 16, 2023 (CN) ......................... 202321561754.5

(51) Int. Cl.
*B66D 1/36* (2006.01)
*B66D 1/60* (2006.01)

(52) U.S. Cl.
CPC *B66D 1/36* (2013.01); *B66D 1/60* (2013.01)

(58) Field of Classification Search
CPC ... B66D 1/36; B66D 1/60; B66D 1/28; B65H 57/00; B65H 57/04
USPC ....................................................... 242/615.3
See application file for complete search history.

(56) References Cited

U.S. PATENT DOCUMENTS

| | | |
|---|---|---|
| 1,386,052 A | 8/1921 | Duggan |
| 1,945,702 A | 2/1934 | Pitter |
| 2,090,445 A | 8/1937 | Hale et al. |
| 4,103,872 A | 8/1978 | Hirasuka |
| 4,127,295 A | 11/1978 | Robinson |
| 5,048,854 A | 9/1991 | Clark |

(Continued)

FOREIGN PATENT DOCUMENTS

| | | |
|---|---|---|
| CH | 597010 A5 | 3/1978 |
| CN | 203728468 U | 2/2014 |

(Continued)

OTHER PUBLICATIONS

International Search Report of the International Searching Authority for PCT International Application No. PCT/CN2019/077842 mailed Oct. 12, 2019, 13 pages with English translation.

(Continued)

*Primary Examiner* — William A. Rivera
(74) *Attorney, Agent, or Firm* — Perkins Coie LLP

(57) ABSTRACT

Disclosed are devices, systems, and methods for a rope guide, and in particular, a magnetic-attraction rope-guide protective shell and a rope guide assembly. In some embodiments, a magnetic-attraction rope-guide protective shell includes a shell body and a magnetic attraction member; and the shell body has an inner cavity for accommodating a rope guide, and the magnetic attraction member is arranged on the shell body and is configured to fix the shell body separated from the rope guide.

8 Claims, 3 Drawing Sheets

(56) References Cited

U.S. PATENT DOCUMENTS

| | | | | | |
|---|---|---|---|---|---|
| 5,056,698 | A * | 10/1991 | Kozakevich | B60R 13/105 242/398 |
| 5,255,767 | A * | 10/1993 | Norwood | H02G 11/02 224/400 |
| 5,663,541 | A | 9/1997 | McGregor, II | |
| 6,050,290 | A | 4/2000 | Zhan | |
| 6,681,507 | B1 | 1/2004 | Lieziert | |
| 7,617,840 | B1 | 11/2009 | Zinda | |
| 8,267,379 | B2 | 9/2012 | Yang et al. | |
| 8,469,305 | B2 | 6/2013 | Feldstein et al. | |
| 8,973,902 | B2 | 3/2015 | Huang | |
| 9,388,025 | B2 | 7/2016 | Costa | |
| 10,093,522 | B1 | 10/2018 | Baugh | |
| 10,519,012 | B1 * | 12/2019 | Hare | B66D 1/36 |
| 10,562,743 | B2 * | 2/2020 | Fretz | B63B 21/10 |
| D901,821 | S * | 11/2020 | Zheng | D8/356 |
| 11,155,450 | B2 | 10/2021 | Fan et al. | |
| 11,485,180 | B2 | 11/2022 | Najarro | |
| 11,713,223 | B2 | 8/2023 | Zhan et al. | |
| 11,965,288 | B2 | 4/2024 | De Jager et al. | |
| 12,319,549 | B1 * | 6/2025 | Liu | B66D 1/00 |
| D1,094,204 | S | 9/2025 | Yu et al. | |
| 2006/0054731 | A1 | 3/2006 | Nagler | |
| 2007/0267148 | A1 * | 11/2007 | Steele | B65H 35/0026 156/577 |
| 2008/0164364 | A1 * | 7/2008 | Kaltman | B65H 54/62 242/407 |
| 2011/0065546 | A1 | 3/2011 | Xie et al. | |
| 2015/0203325 | A1 * | 7/2015 | Briggs | B65H 49/36 242/588 |
| 2015/0298935 | A1 * | 10/2015 | Langeman | B65H 49/327 242/588 |
| 2016/0016766 | A1 | 1/2016 | Ho | |
| 2016/0158584 | A1 | 6/2016 | Burke et al. | |
| 2017/0321851 | A1 * | 11/2017 | Fretz | B63B 21/10 |
| 2018/0118530 | A1 | 5/2018 | August | |
| 2018/0215591 | A1 | 8/2018 | Anderson | |
| 2019/0292026 | A1 | 9/2019 | Felps | |
| 2019/0300344 | A1 | 10/2019 | Cui | |
| 2020/0277169 | A1 | 9/2020 | Zhan | |
| 2020/0299116 | A1 | 9/2020 | Fan | |
| 2021/0155321 | A1 | 5/2021 | Elliott | |
| 2022/0009756 | A1 | 1/2022 | Fan et al. | |
| 2022/0178074 | A1 | 6/2022 | Pavel | |
| 2023/0024630 | A1 | 1/2023 | Kennelly | |
| 2024/0083378 | A1 * | 3/2024 | Anderson | B66D 1/28 |
| 2024/0166152 | A1 * | 5/2024 | Zhang | B66D 1/00 |
| 2024/0351830 | A1 | 10/2024 | Yu et al. | |
| 2024/0351831 | A1 | 10/2024 | Yu et al. | |

FOREIGN PATENT DOCUMENTS

| | | | | |
|---|---|---|---|---|
| CN | 104925691 | A | | 9/2015 |
| CN | 206188291 | U | | 5/2017 |
| CN | 206188292 | U | | 5/2017 |
| CN | 206606959 | U | | 11/2017 |
| CN | 107601333 | A | | 1/2018 |
| CN | 207361653 | U | | 5/2018 |
| CN | 207537039 | U | | 6/2018 |
| CN | 208037900 | U | | 11/2018 |
| CN | 208532082 | U | | 2/2019 |
| CN | 210286571 | U | | 4/2020 |
| CN | 112645208 | A | | 4/2021 |
| DE | 10300960 | A1 | | 7/2004 |
| DE | 102007044287 | A | | 3/2009 |
| GB | 2 328 919 | | * | 3/1999 |
| GB | 2566315 | A | | 3/2019 |
| KR | 101719102 | B1 | | 3/2017 |
| WO | 2015013790 | A1 | | 2/2015 |
| WO | 2018110886 | A1 | | 6/2018 |

OTHER PUBLICATIONS

U.S. Appl. No. 16/742,632 Notice of Allowance Mailed Jun. 29, 2021, pp. 1-7.

U.S. Appl. No. 16/737,667, Restriction Requirement Mailed Mar. 21, 2022, pp. 1-6.

U.S. Appl. No. 18/335,980 Non-Final Office Action Mailed Jan. 23, 2024, pp. 1-11.

U.S. Appl. No. 18/335,993, Non-Final Office Action Mailed Jan. 30, 2024, pp. 1-11.

U.S. Appl. No. 17/484,950, Non-Final Office Action mailed Feb. 21, 2024, pp. 1-12.

Chinese Application No. 201910149808.9 Office Action Mailed Dec. 1, 2023, with English Translation, pp. 1-18.

Chinese Application No. 201910149845.X, Office Action mailed Jan. 2, 2024, with English Translation, pp. 1-10.

U.S. Appl. No. 18/335,980, Notice of Allowance mailed Jun. 6, 2024, pp. 8.

U.S. Appl. No. 18/335,993, Notice of Allowance Mailed May 15, 2024, pp. 1-8.

Non-Final Office Action for U.S. Appl. No. 18/515,041, mailed on Oct. 1, 2025, 7 pages.

Non-Final Office Action for U.S. Appl. No. 18/775,958, mailed on Jan. 23, 2026, 11 pages.

* cited by examiner

MAGNETIC-ATTRACTION ROPE-GUIDE PROTECTIVE SHELL, ROPE GUIDE ASSEMBLY, AND VEHICLE

CROSS-REFERENCE TO RELATED APPLICATIONS

This patent document claims priority to and benefits of Chinese Patent Application No. 202321561754.5, filed on Jun. 16, 2023, and Chinese Patent Application No. 202320960679.3, filed on Apr. 24, 2023. The entire contents of the aforementioned patent documents are incorporated by reference for all purposes.

TECHNICAL FIELD

This patent document relates to rope guide equipment and, in particular, to a magnetic-attraction rope-guide protective shell and a rope guide assembly.

BACKGROUND

Vehicle winches are mainly used for off-road vehicles, agricultural vehicles, ATV sports vehicles, yachts, and other special vehicles. They are self-protection and traction devices for vehicles and ships. The vehicle winch has a rope guide for guiding and winding the strand rope onto the reel or drum. In the related art, a protective shell is mounted to the rope guide through bolt connection to protect the rope guide when the rope guide is not working. However, when the rope guide works, the detached protective shell is placed at will and thus tends to be lost.

SUMMARY

In some aspects, a magnetic-attraction rope-guide protective shell according to some embodiments of the present technology includes: a shell body having an inner cavity for accommodating a rope guide; and a magnetic attraction member arranged on the shell body and configured to fix the shell body separated from the rope guide.

In some aspects, a rope guide assembly according to some embodiments of the present technology includes a rope guide and a magnetic-attraction rope-guide protective shell. The magnetic-attraction rope-guide protective shell includes: a shell body having an inner cavity for accommodating a rope guide; and a magnetic attraction member arranged on the shell body and configured to fix the shell body separated from the rope guide.

In some aspects, a vehicle according to some embodiments of the present technology includes: a vehicle body; and a winch device. The winch device includes a rope guide assembly. The rope guide assembly includes a rope guide and a magnetic-attraction rope-guide protective shell. The magnetic-attraction rope-guide protective shell includes: a shell body having an inner cavity for accommodating a rope guide; and a magnetic attraction member arranged on the shell body and configured to fix the shell body separated from the rope guide. The winch device is arranged on the vehicle body, the rope guide is located on a surface of the vehicle body, and the shell body has a protection position and a separation position. In the protection position, the shell body covers the rope guide, and in the separation position, the shell body is separated from the rope guide and the shell body is fixed to the vehicle body through the magnetic attraction member.

The subject matter described in this patent document can be implemented in specific ways that provide one or more of the following features.

DETAILED DESCRIPTION

Embodiments of the present technology are described in detail below, and examples of the embodiments are shown in the attached drawings. The embodiments described below by referring to the attached drawings are illustrative and are intended to explain the present technology but cannot be understood as limitations to the present technology.

Hereinafter, referring to FIGS. 1 and 3, a magnetic-attraction rope-guide protective shell, a rope guide assembly, a winch device, and a vehicle according to example embodiments of the present technology will be described.

Figure 1:
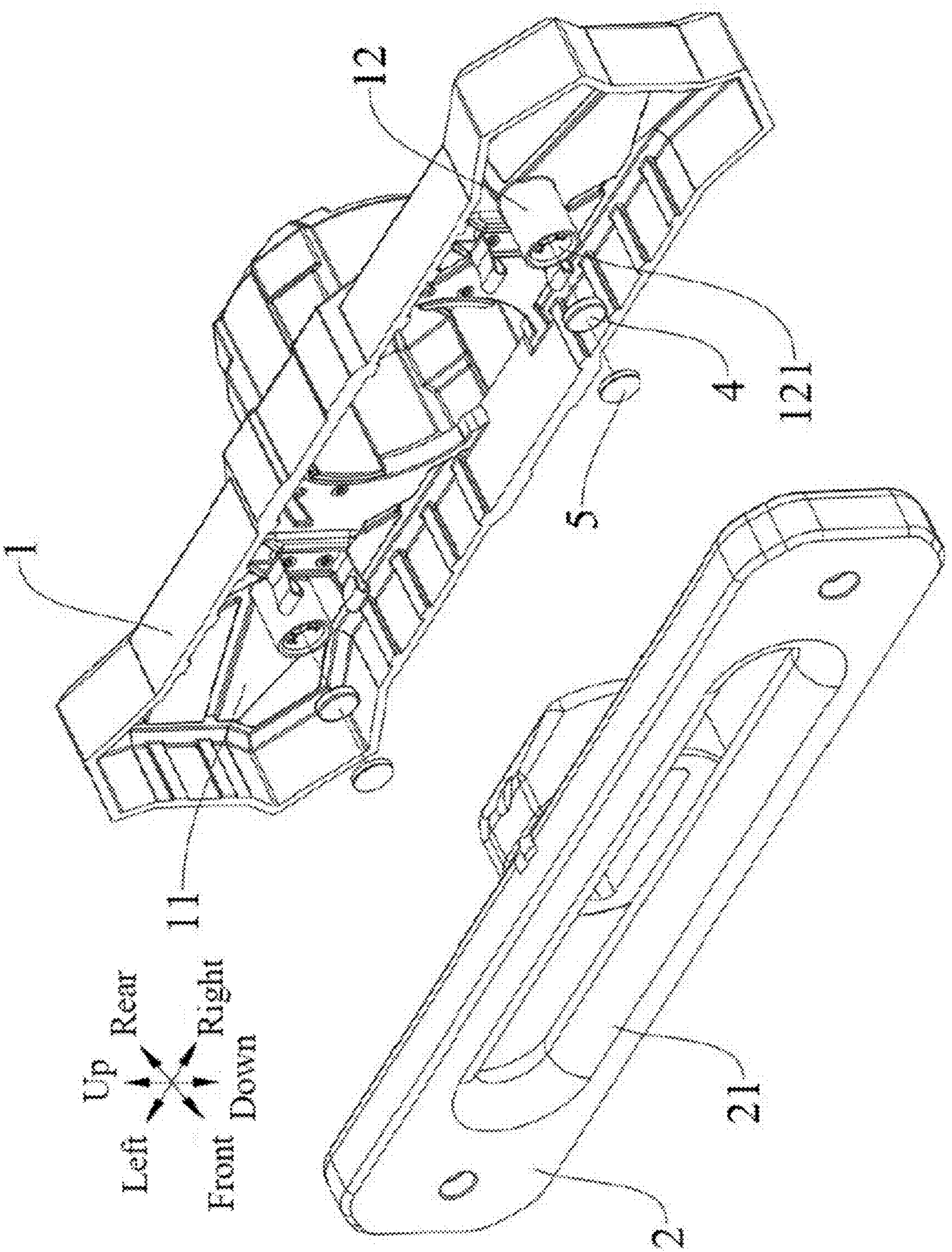
FIG. 1 is an exploded view of a rope guide assembly according to some embodiments of the present technology.
Figure 3:
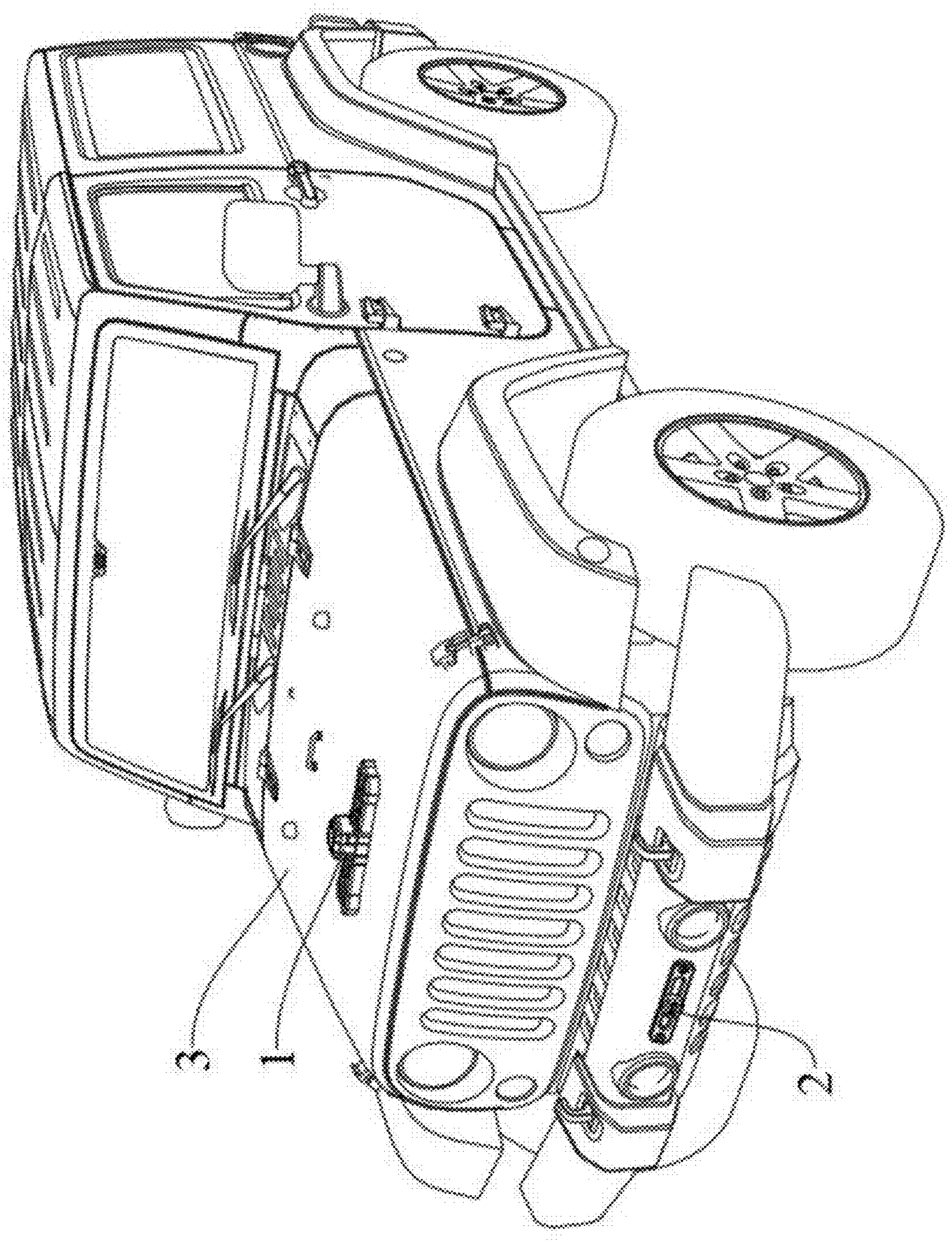
FIG. 3 is another schematic view of a vehicle according to some embodiments of the present technology, in which a shell body is in a separation position.

As shown in FIG. 1 and FIG. 3, the magnetic-attraction rope-guide protective shell of the embodiments of the present technology includes a shell body 1 and a magnetic attraction member 4.

The shell body 1 has an inner cavity 11 for accommodating a rope guide 2. The magnetic attraction member 4 is arranged to the shell body 1 and is configured to fix the shell body 1 separated from the rope guide 2.

Figure 2:
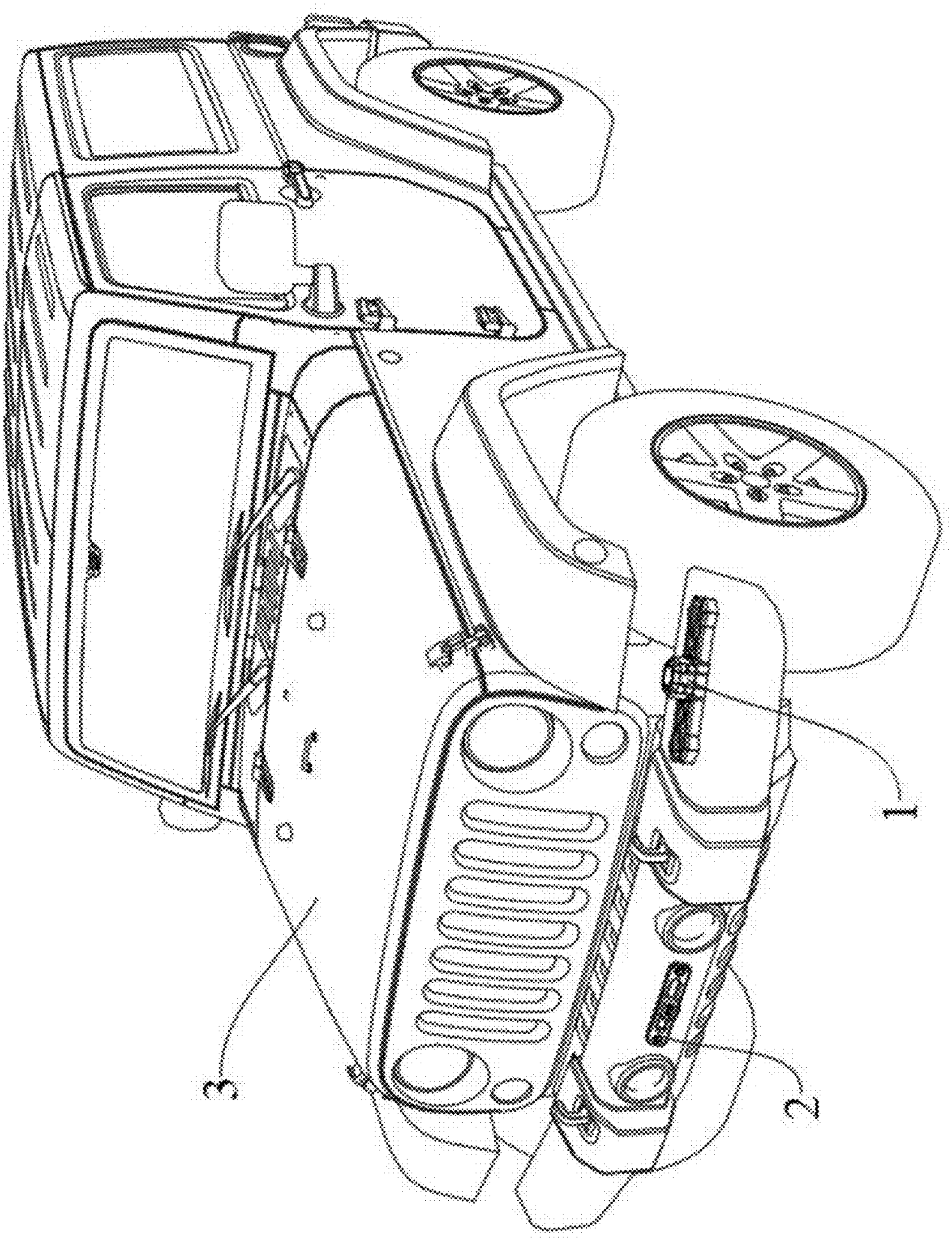
FIG. 2 is a schematic view of a vehicle according to some embodiments of the present technology, in which a shell body is in a separation position.

Specifically, as shown in FIG. 1 to FIG. 3, a front end surface of the shell body 1 has a groove to form the inner cavity 11, and the inner cavity 11 is configured for accommodating the rope guide 2. The shell body 1 is provided with the magnetic attraction member 4, and the magnetic attraction member 4 is configured to fix the shell body 1 separated from the rope guide 2. In some embodiments, the rope guide 2 is arranged on a vehicle body 3, and the shell body 1 can cover the rope guide 2, so that the rope guide 2 is located in the inner cavity 11 to protect the rope guide 2. The shell body 1 can also be separated from the rope guide 2 and fixed on the vehicle body 3 by the magnetic attraction member 4, so as to prevent the shell body 1 from being lost when the rope guide 2 works.

It may be understood that the rope guide is not limited to being arranged on the vehicle body, and in other embodiments, the rope guide may be arranged on a hull.

The magnetic-attraction rope-guide protective shell in the embodiments of the present technology is provided with the magnetic attraction member on the shell body, and the shell body separated from the rope guide is fixed by the magnetic attraction member, so as to avoid the loss of the magnetic-attraction rope-guide protective shell.

In some embodiments, the rope guide 2 has a guide opening 21 running through the rope guide 2 in a first direction (a front-rear direction as shown in FIG. 1), the shell body 1 has a mounting bracket 12, the mounting bracket 12 is arranged in the inner cavity 11 and can be inserted into the guide opening 21, and the magnetic attraction member 4 is arranged to an end of the mounting bracket 12.

As shown in FIG. 1, the rope guide 2 has the guide opening 21 running through the rope guide 2 in the front-rear direction, and the guide opening 21 is configured to be passed through by a strand rope, so as to guide the strand rope. The shell body 1 has a mounting bracket 12, the mounting bracket 12 is arranged in the inner cavity 11 and extends forwards from a rear end face of the inner cavity 11 (e.g., an inner bottom surface of the shell body 1, which is behind the inner cavity 11). When the rope guide 2 is located in the inner cavity 11, the mounting bracket 12 passes through the guide opening 21. The magnetic attraction member 4 is arranged to the end of the mounting bracket 12 to be able to fix the shell body 1 separated from the rope guide 2.

It can be understood that the magnetic attraction member is not limited to being arranged to the mounting bracket, and in other embodiments, the magnetic attraction member may be arranged on a front end face of the shell body, or the magnetic attraction member may be arranged on a circumferential wall surface of the inner cavity (e.g., an inner circumferential surface of the shell body 1, which is located between the front end face and the inner bottom surface of the shell body 1) and is flush with the front end face of the shell body.

In some embodiments, an end face of the mounting bracket 12 has a mounting cavity 121, and at least part of the magnetic attraction member 4 is arranged in the mounting cavity 121.

As shown in FIG. 1, a front end face of the mounting bracket 12 has the mounting cavity 121, and at least part of the magnetic attraction member 4 is arranged in the mounting cavity 121 to fix the magnetic attraction member 4, so that the magnetic attraction member 4 can attract the vehicle body 3.

In some embodiments, the magnetic-attraction rope-guide protective shell in the embodiments of the present technology further includes a buffer pad 5, which is arranged on the mounting bracket 12, and at least part of the buffer pad 5 protrudes outwards from the end face of the mounting bracket 12.

As shown in FIG. 1, the buffer pad 5 is arranged on the mounting bracket 12, and a front end face of the buffer pad 5 is in front of the front end face of the mounting bracket 12. When the magnetic attraction member 4 attracts the vehicle body 3 to fix the shell body 1 on the vehicle body 3, the front end face of the buffer pad 5 is in contact with the vehicle body 3, so that the connection stability is improved by increasing the friction between the mounting bracket 12 and the vehicle body 3, and also, the mounting bracket 12 and the magnetic attraction member 4 are prevented from scratching the surface of the vehicle body 3 and destroying the paint surface of the vehicle body 3. In some embodiments, the buffer pad 5 is made of buffer foam.

It can be understood that in other embodiments, the magnetic-attraction rope-guide protective shell may not have the buffer pad, the magnetic attraction member is arranged in the mounting cavity, a front end face of the magnetic attraction member is flush with the front end face of the mounting bracket or protrudes forwards out of the mounting cavity, and the front end face of the magnetic attraction member attracts and abuts against the surface of the vehicle body 3.

In some embodiments, the magnetic attraction member 4 is arranged in the mounting cavity 121, one end of the buffer pad 5 is located in the mounting cavity 121, and the other end of the buffer pad 5 is located outside the mounting cavity 121.

As shown in FIG. 1, the whole magnetic attraction member 4 is embedded in the mounting cavity 121, the buffer pad 5 is arranged in front of the magnetic attraction member 4, a rear end of the buffer pad 5 is embedded in the mounting cavity 121, and a front end of the buffer pad 5 extends forwards out of the mounting cavity 121, so as to increase the friction and avoid scratching the surface of the vehicle body 3. Also, the buffer pad 5 will not affect the attraction force of the magnetic attraction member 4.

It can be understood that the buffer pad is not limited to being embedded in the mounting cavity, and in other embodiments, the buffer pad is an annular gasket arranged on the front end face of the mounting bracket.

In some embodiments, the mounting bracket 12 is a cylinder extending along the first direction, the mounting cavity 121 has a circular cross section, the buffer pad 5 and the magnetic attraction member 4 are circular sheets, and a chamfered surface is provided between a circumferential wall surface of the mounting cavity 121 and an end surface of the mounting bracket 12.

As shown in FIG. 1, the mounting bracket 12 is cylindrical and extends forwards from the rear end face of the inner cavity 11 (e.g., the inner bottom surface of the shell body 1), the cross section of the mounting cavity 121 is circular, both the buffer pad 5 and the magnetic attraction member 4 are circular sheets, and a chamfered surface is connected between the circumferential wall surface of the mounting cavity 121 and the front end face of the mounting bracket 12, so that it is convenient for the buffer pad 5 and the magnetic attraction member 4 to be embedded in the mounting cavity 121.

In some embodiments, at least two mounting brackets 12 are provided, and the at least two mounting brackets 12 are spaced apart along a second direction (e.g., a left-right direction as shown in FIG. 1). The second direction is orthogonal to the first direction.

As shown in FIG. 1, the guide opening 21 has a strip shape (e.g., an elongated shape) extending in the left-right direction, and in some embodiments, two mounting brackets 12 are provided. The two mounting brackets 12 are spaced apart in the left-right direction, and each mounting bracket 12 is provided with the buffer pad 5 and the magnetic attraction member 4. When the rope guide 2 is located in the inner cavity 11, the two mounting brackets 12 can prevent the shell body 1 from rotating around the front-rear direction relative to the rope guide 2, thus improving the mounting stability of the magnetic-attraction rope-guide protective shell.

As shown in FIG. 1, the rope guide assembly in the embodiments of the present technology includes the rope guide 2 and the magnetic-attraction rope-guide protective shell in the embodiments of the present technology.

Specifically, the magnetic-attraction rope-guide protective shell can cover the rope guide 2, so that the rope guide 2 is located in the inner cavity 11 to protect the rope guide 2. The magnetic-attraction rope-guide protective shell can also be separated from the rope guide 2, and further be attracted to the vehicle body 3 through the magnetic attraction member 4, so as to prevent the magnetic-attraction rope-guide protective shell from being lost when the rope guide 2 works.

The rope guide assembly in the embodiments of the present technology includes the magnetic-attraction rope-guide protective shell in the embodiments of the present technology, and the magnetic-attraction rope-guide protective shell is fixed by the magnetic attraction member when separated from the rope guide, so as to avoid the loss of the magnetic-attraction rope-guide protective shell.

As shown in FIGS. 1-3, the winch device in the embodiments of the present technology includes the rope guide assembly in the embodiments of the present technology.

Specifically, a main body of the winch device may be a vehicle winch, and the vehicle winch may be arranged on a vehicle or a ship. The vehicle winch includes a relay transmission, a motor, a rope drum, and a clutch arranged in the vehicle or the ship. The rope drawn from the rope drum passes through the rope guide 2 in the rope guide assembly so as to be guided, and the rope guide 2 is arranged on the surface of the vehicle or the ship. The magnetic-attraction rope-guide protective shell can cover the rope guide 2, so that the rope guide 2 is located in the inner cavity 11, thus protecting the rope guide 2. The magnetic-attraction rope-guide protective shell can also be separated from the rope guide 2 and attracted to the surface of the vehicle or the ship through the magnetic attraction member 4, so as to prevent the magnetic-attraction rope-guide protective shell from being lost when the rope guide 2 works.

The winch device in the embodiments of the present technology comprises the rope guide assembly in the embodiments of the present technology, and the magnetic-attraction rope-guide protective shell protects the rope guide. When the magnetic-attraction rope-guide protective shell is separated from the rope guide, it is fixed by the magnetic attraction member to avoid the loss of the magnetic-attraction rope-guide protective shell.

As shown in FIGS. 1-3, the vehicle in the embodiments of the present technology includes a vehicle body 3 and a winch device.

The winch device is the winch device in the embodiments of the present technology. The winch device is arranged on the vehicle body 3, and the rope guide 2 is located on the surface of the vehicle body 3. The shell body 1 has a protection position and a separation position. In the protection position, the shell body 1 covers the rope guide 2. In the separation position, the shell body 1 is separated from the rope guide 2, and the shell body 1 is fixed on the vehicle body 3 by the magnetic attraction member 4.

Specifically, as shown in FIGS. 2 and 3, the rope guide 2 is arranged on a front bumper of the vehicle body 3, and the shell body 1 has the protection position and the separation position. In the protection position, the shell body 1 covers the rope guide 2, so that the rope guide 2 is located in the inner cavity 11, thus protecting the rope guide 2. In the separation position, the shell body 1 is separated from the rope guide 2, and the shell body 1 can be attracted to the front bumper of the vehicle body 3 through the magnetic attraction member 4 or can be attracted to a front hood of the vehicle body 3 through the magnetic attraction member 4, so as to avoid the loss of the shell body 1.

The vehicle in the embodiments of the present technology includes the winch device in the embodiments of the present technology, the magnetic-attraction rope-guide protective shell in the protection position can protect the rope guide, and the magnetic-attraction rope-guide protective shell in the separation position is fixed on the vehicle body through the magnetic attraction member, so as to avoid the loss of the magnetic-attraction rope-guide protective shell.

In the description of the present disclosure, it should be understood that terms such as "central," "up," "down," "front," "rear," "left," "right," "inner," or "outer" should be construed to refer to the orientation or position as shown in the drawings, and these relative terms are only for convenience and simplification of description rather than indicating or implying that the referred device or element must have a particular orientation and be constructed and operated in a particular orientation and therefore should not be construed as limiting the present technology.

In addition, terms such as "first" and "second" are used herein for purposes of description and are not intended to indicate or imply relative importance or significance or implicitly indicate the number of technical features indicated. Therefore, the feature defined as "first" or "second" may explicitly or implicitly include at least one such feature. In the description of the present disclosure, "a plurality of" means at least two, such as two, three, etc., unless specified or limited otherwise.

In the present disclosure, unless specified or limited otherwise, the terms "mount," "couple," "connect," and "fix" should be broadly understood. For example, they may refer to the fixed connection, the detachable connection, or the integration; they may refer to the mechanical connection, the electrical connection, or the mutual communication; they may refer to the direct connection or the indirect connection through the intermediate medium, and they may refer to the internal communication of two elements or the interaction between two elements, unless specified otherwise. For those with ordinary skill in the art, the specific meanings of the above terms in the present disclosure may be understood according to specific situations.

In the present disclosure, unless specified or limited otherwise, a structure in which a first feature is "on" or "below" a second feature may include an embodiment in which the first feature directly contacts the second feature and may also include an embodiment in which the first feature indirectly contacts the second feature through an intermediate medium. Furthermore, a first feature "on," "above," or "on top of" a second feature may include an embodiment in which the first feature is right "on," "above," or "on top of" the second feature, may also include an embodiment in which the first feature is obliquely "on," "above," or "on top of" the second feature, or may just mean that the first feature is at a height higher than that of the second feature. A first feature "beneath," "below," or "on bottom of" a second feature may include an embodiment in which the first feature is right "beneath," "below," or "on bottom of" the second feature, may also include an embodiment in which the first feature is obliquely "beneath," "below," or "on bottom of" the second feature, or may just mean that the first feature is at a height lower than that of the second feature.

In the present disclosure, the terms "one embodiment," "some embodiments," "examples," "specific examples," or "some examples," etc., mean that the specific features, structures, materials, or characteristics described in connection with this embodiment or example are included in at least one embodiment or example of the present technology. In this specification, the schematic expressions of the above terms are not necessarily aimed at the same embodiment or example. Moreover, the specific features, structures, materials, or characteristics described may be combined in any one or more embodiments or examples in a suitable manner. In addition, those skilled in the art can combine and group different embodiments or examples and features of different embodiments or examples described in this specification without mutual contradiction.

Although the above embodiments have been shown and described, it would be understood that the above embodiments are illustrative and cannot be construed to limit the present technology, and changes, modifications, alternatives, and variants of the above embodiments made by those with ordinary skill in the art fall within the scope of protection of the present technology.

EXAMPLES

In some embodiments in accordance with the present technology (example 1), a magnetic-attraction rope-guide protective shell includes a shell body having an inner cavity for accommodating a rope guide; and a magnetic attraction member arranged on the shell body and configured to fix the shell body separated from the rope guide.

Example 2 includes the magnetic-attraction rope-guide protective shell of example 1 or any of examples 1-7, wherein the rope guide has a guide opening running through the rope guide in a first direction, and wherein the shell body comprises a mounting bracket, the mounting bracket arranged in the inner cavity and configured to pass through the guide opening, and the magnetic attraction member arranged at an end of the mounting bracket.

Example 3 includes the magnetic-attraction rope-guide protective shell of example 2 or any of examples 1-7, wherein an end face of the mounting bracket has a mounting cavity, and at least part of the magnetic attraction member is arranged in the mounting cavity.

Example 4 includes the magnetic-attraction rope-guide protective shell of example 3 or any of examples 1-7, further comprising a buffer pad arranged on the mounting bracket, wherein at least part of the buffer pad protrudes outwards from the end face of the mounting bracket.

Example 5 includes the magnetic-attraction rope-guide protective shell of example 4 or any of examples 1-7, wherein the magnetic attraction member is arranged in the mounting cavity, one end of the buffer pad is arranged in the mounting cavity, and the other end of the buffer pad is located outside the mounting cavity.

Example 6 includes the magnetic-attraction rope-guide protective shell of example 5 or any of examples 1-7, wherein the mounting bracket is cylindrical and extends along the first direction, the mounting cavity has a circular cross section, the buffer pad and the magnetic attraction member are circular sheets, and a chamfered surface is arranged between a circumferential wall surface of the mounting cavity and the end face of the mounting bracket.

Example 7 includes the magnetic-attraction rope-guide protective shell of example 2 or any of examples 1-6, wherein at least two mounting brackets are provided, and the at least two mounting brackets are spaced apart along a second direction, wherein the second direction is orthogonal to the first direction.

In some embodiments in accordance with the present technology (example 8), a rope guide assembly includes a rope guide and a magnetic-attraction rope-guide protective shell, and the magnetic-attraction rope-guide protective shell, which comprises a shell body having an inner cavity for accommodating a rope guide, and a magnetic attraction member arranged on the shell body and configured to fix the shell body separated from the rope guide.

In some embodiments in accordance with the present technology (example 9), a vehicle includes a vehicle body, and a winch device that comprises a rope guide assembly, where the rope guide assembly comprises a rope guide and a magnetic-attraction rope-guide protective shell. The magnetic-attraction rope-guide protective shell includes a shell body having an inner cavity for accommodating a rope guide, and a magnetic attraction member arranged on the shell body and configured to fix the shell body separated from the rope guide. The winch device is arranged on the vehicle body, the rope guide is located on a surface of the vehicle body, and the shell body has a protection position and a separation position, wherein in the protection position, the shell body covers the rope guide, and in the separation position, the shell body is separated from the rope guide, and the shell body is fixed to the vehicle body through the magnetic attraction member.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A magnetic-attraction rope-guide protective shell for a vehicle rope guide, comprising:
- a shell body having an inner cavity configured to accommodate a rope guide that is configured to be arranged on a vehicle body; and
- a magnetic attraction member arranged on the shell body,
- wherein the shell body has a protection position and a separation position, wherein, in the protection position, the shell body is configured to cover the rope guide, and wherein, in the separation position, the shell body is configured to be separated from the rope guide and fixed to the vehicle body through the magnetic attraction member to expose the rope guide for operation,
- wherein the rope guide has a guide opening running through the rope guide in a first direction,
- wherein the shell body comprises a mounting bracket, the mounting bracket arranged in the inner cavity and configured to pass through the guide opening, and
- wherein the magnetic attraction member is arranged at an end of the mounting bracket.

2. The magnetic-attraction rope-guide protective shell according to claim 1, wherein an end face of the mounting bracket has a mounting cavity, and at least part of the magnetic attraction member is arranged in the mounting cavity.

3. The magnetic-attraction rope-guide protective shell according to claim 2, further comprising a buffer pad arranged on the mounting bracket, wherein at least part of the buffer pad protrudes outwards from the end face of the mounting bracket.

4. The magnetic-attraction rope-guide protective shell according to claim 3, wherein the magnetic attraction member is arranged in the mounting cavity, one end of the buffer pad is arranged in the mounting cavity, and the other end of the buffer pad is located outside the mounting cavity.

5. The magnetic-attraction rope-guide protective shell according to claim 4, wherein the mounting bracket is cylindrical and extends along the first direction, the mounting cavity has a circular cross section, the buffer pad and the magnetic attraction member are circular sheets, and a chamfered surface is arranged between a circumferential wall surface of the mounting cavity and the end face of the mounting bracket.

6. The magnetic-attraction rope-guide protective shell according to claim 1, wherein at least two mounting brackets are provided, and the at least two mounting brackets are spaced apart along a second direction, wherein the second direction is orthogonal to the first direction.

7. A rope guide assembly for a vehicle, comprising:
- a rope guide configured to be arranged on a vehicle body; and
- a magnetic-attraction rope-guide protective shell,
  - a shell body having an inner cavity configured to accommodate the rope guide; and
  - a magnetic attraction member arranged on the shell body,
  - wherein the shell body has a protection position and a separation position, wherein, in the protection position, the shell body is configured to cover the rope guide, and wherein, in the separation position, the shell body is configured to be separated from the rope guide and fixed to the vehicle body through the magnetic attraction member to expose the rope guide for operation,
- wherein the rope guide has a guide opening running through the rope guide in a first direction,
  - wherein the shell body comprises a mounting bracket, the mounting bracket arranged in the inner cavity and configured to pass through the guide opening, and
  - wherein the magnetic attraction member is arranged at an end of the mounting bracket.

8. A vehicle, comprising:
- a vehicle body; and
- a winch device comprising a rope guide assembly, the rope guide assembly comprising a rope guide arranged on the vehicle body and a magnetic-attraction rope-guide protective shell, wherein the magnetic-attraction rope-guide protective shell comprising comprises:
  - a shell body having an inner cavity configured to accommodate the rope guide; and
  - a magnetic attraction member arranged on the shell body,
- wherein the winch device is arranged on the vehicle body, the rope guide is located on a surface of the vehicle body, and the shell body has a protection position and a separation position, wherein in the protection position, the shell body covers the rope guide, and in the separation position, the shell body is separated from the rope guide, and the shell body is fixed to the vehicle body through the magnetic attraction member to expose the rope guide for operation.

* * * * *